United States Patent [19]
Millet et al.

[11] Patent Number: 5,444,694
[45] Date of Patent: Aug. 22, 1995

[54] METHOD FOR THE RECONFIGURATION OF A MESHED NETWORK

[75] Inventors: Guy Millet, Vanves; Vincent Gillet, Paris, both of France

[73] Assignee: Thomson-CSF, Paris, France

[21] Appl. No.: 210,295

[22] Filed: Mar. 18, 1994

[30] Foreign Application Priority Data

Mar. 19, 1993 [FR] France ................... 93 03204

[51] Int. Cl.⁶ .................................. H04L 12/423
[52] U.S. Cl. .................................. 370/16.1; 370/54; 370/60; 370/94.3
[58] Field of Search ............... 370/16, 14, 16.1, 60, 370/60.1, 61, 85.1, 85.5, 85.9, 85.12, 85.15, 94.3; 340/826, 827

[56] References Cited

U.S. PATENT DOCUMENTS

| | | | |
|---|---|---|---|
| 4,733,391 | 3/1988 | Godbold | 370/16.1 |
| 5,179,548 | 1/1993 | Sandesara | 370/16.1 |
| 5,327,427 | 7/1994 | Sandesara | 370/16.1 |

FOREIGN PATENT DOCUMENTS

| | | |
|---|---|---|
| 0400879 | 12/1990 | European Pat. Off. . |
| WO84/02244 | 6/1984 | WIPO . |
| WO93/00756 | 1/1993 | WIPO . |

OTHER PUBLICATIONS

Patent Abstract of Japan, vol. 014, No. 336(E-0953) Jul. 19, 1990 & JP-A-02 113 741, Apr. 25, 1990, Sakauchi Hideki, "Communication Processing System".

IEEE Communications Magazine, vol. 23, No. 11, J. Prisco, et al., "Fiber Optic Regional Area Networks", pp. 26–39, Nov. 1985.

IEEE Global Telecommunications Conference, vol. 1, Wayne D. Grover, "Case Studies of Survivable Ring, Mesh and Mesh-Arc Hybrid Networks", pp. 633–638, Dec. 6, 1992.

IEEE Conference on Computer Communications IMFOCOM, Khiem Van Le, et al., "Fault-Tolerant Routing In A Class of Double Loop Networks", pp. 0264–0273, Mar. 27, 1988.

International Conference on Communications vol. 3, Yasuyo Okanoue, et al., "sonet Self-Healing Networks For STS-1/Nc Path Restoration", pp. 1659–1644, Jun. 14, 1992.

*Primary Examiner*—Douglas W. Olms
*Assistant Examiner*—Huy D. Vu
*Attorney, Agent, or Firm*—Oblon, Spivak, McClelland, Maier & Neustadt

[57] ABSTRACT

The method relates to the reconfiguration of meshed networks for telecommunications systems with time-division multiplexing, i.e. to a modification of the routing of the signals so that they can be sent with the utmost efficiency despite breaks in the network. In a network comprising nodes distributed in a loop and, possibly, lateral nodes, when breaks cause the loop to be split into sections, the method consists in using standby lines, if any, to connect the lines to one another and to select these standby lines to join the nodes into one network reconfigured by a path without redundancies, i.e. by a path in which the lines are crossed once and only once in each direction. Application to networks for telecommunications systems with time-division multiplexing.

5 Claims, 3 Drawing Sheets

METHOD FOR THE RECONFIGURATION OF A MESHED NETWORK

BACKGROUND OF THE INVENTION

In the field of telecommunications systems with time-division multiplexing, the present invention relates to meshed networks formed by nodes and designed to exchange information signals by means of lines connecting these nodes to one another. The invention relates more specifically to a method for the reconfiguration of a meshed network. It may be recalled that the reconfiguration of a meshed network is the technique wherein, when a meshed network is partially defective and when, consequently, the signals are no longer being sent out accurately, the routing of the signals is modified to ensure that they are sent, as far as possible, to every non-defective node of the network for which they are intended.

With a network limited to a loop formed by alternating nodes and lines, there are known ways of having lines formed by a primary link and a secondary link and of isolating the defective parts by the interconnection of the primary link and the secondary link of each of the lines closest to the defective parts of the loop. The sending of the signals which, before the appearance of the defect or defects, is done by using the primary links alone, is then done along a path that uses the primary links in one direction and the secondary links in the opposite direction. This technique, which has been called the technique of reconfiguration by negative feedback loop, has the drawback wherein, once there is more than one defect, the network gets split up into as many mutually independent networks as there are distinct defects.

There is also a known way of using a network wherein the lines are permanently bidirectional and wherein the number of lines that can reach a node is not limited. The reconfiguration in this case, if for example a given node is out of order, consists in making the information signals, which would have gone through the given node in normal operation, go through the nodes surrounding the given node. The result thereof is an overload of the nodes surrounding the given node, and this overload may lead to the saturation and even to the failure of the nodes concerned.

SUMMARY OF THE INVENTION

The present invention is aimed at preventing or at least at reducing the above-mentioned drawbacks.

This is obtained, in a meshed network designed for this purpose with appropriately arranged known elements, by the linkage, when defects appear, of the non-defective nodes by means of standby lines that are set aside for this purpose and are not used during the normal operation of the network. The method consists in then optimizing the new network in order to send the information signals on a single path, i.e. a path in which, whatever the point considered, a signal can come from only one direction.

According to the present invention, there is provided a method for the reconfiguration of a meshed network formed by at least three nodes and four lines, each of the nodes having at most three ports and some of them, assigned priorities that are all distinct from one another, being likely to take control over the network, n of the nodes and n of the lines, with n greater than 2, known as main nodes and main lines, being arranged in a main loop, and m of the lines, with m as an integer at most equal to n/2, constituting standby lines, not used during the normal operation of the network, between nodes of the main loop, the network being designed for the transmission, by the lines, of signals between the nodes under the control of one of the nodes known as a master node, each line connecting a port of one of the nodes to a port of another of the nodes and comprising a primary link and a secondary link, the two links of one and the same line having opposite directions of signal transmission wherein, when main lines are defective, this method consists in finding out whether there are at least two sections constituted by sound parts of the main loop, each limited by two of the defective main lines, finding out whether there is a group formed by k of the sections, with k as an integer greater than 1, which may be connected to one another by means of k-1 of the standby lines, and creating a reconfigured network by determining, in the group, a single path using the k sections of the group and said k-1 standby lines, this single path passing once and no more than once through each of the primary links and secondary links of each of the k sections of the group and of each of said k-1 standby lines.

BRIEF DESCRIPTION OF THE DRAWINGS

The present invention will be understood more clearly and other characteristics will appear from the following description and from the appended Figures, of which.

In the different Figures, the corresponding elements are designated by the same references.

MORE DETAILED DESCRIPTION

In order to be implemented, the reconfiguration method that shall be described requires a network with a number of structural characteristics that will be presented in the course of the description. The use of these characteristics will appear in the reconfiguration that will be given by way of an example.

The reconfiguration method relates to networks comprising a mesh formed by nodes that are connected to one another by lines in order to exchange information signals such as, for example, telephone signals. These signals may also be directed from a node to a peripheral element connected to the node considered. The term "node" is understood herein to mean a unit comprising the following in a standard way: ports to receive and deliver signals and a management unit with a computer to control the routing of the signals inside the node and, depending on the signal considered, either to prepare it or to process it or to simply transfer it. And it is understood that a connection between two ports can be made without going through the management unit or, at least, without any modification of the information signal during its passage through the node. The term "line in a meshed network" is understood to mean the set of links directly connecting the port of one node to the port of another node, so much so that when the routing of signals is referred to, as in the above sentence, each link that reaches a port or leaves it has to be considered separately.

The network for the implementation of the method is formed by nodes comprising at most three ports and lines comprising exclusively one primary link and one secondary link designed for the transmission of signals in two opposite directions. Furthermore, in normal operation, the network has a mesh, called a loop, with at least three nodes in the loop, one of which has a leading role and is called a master node. The other nodes of the network, if any, are connected by lines to only one of the nodes of the loop. Lines known as standby lines are positioned in parallel on a part of the loop, two of whose nodes they connect. Owing to the fact that the nodes have three ports at most, it is not possible for a node of the loop, at the same time, to be connected by one standby line to another node of the loop and by another line to a node that does not form part of the loop.

It must be noted that, owing to the type of network to which the method of reconfiguration in question is applicable, the number of standby lines should be at least equal to 1 and at most equal to half of the n nodes of the main loop if n is an even number and to half of n-1 if n is an odd number, provided however that there are no lateral lines, given that only three-port nodes are used.

Figure 1:
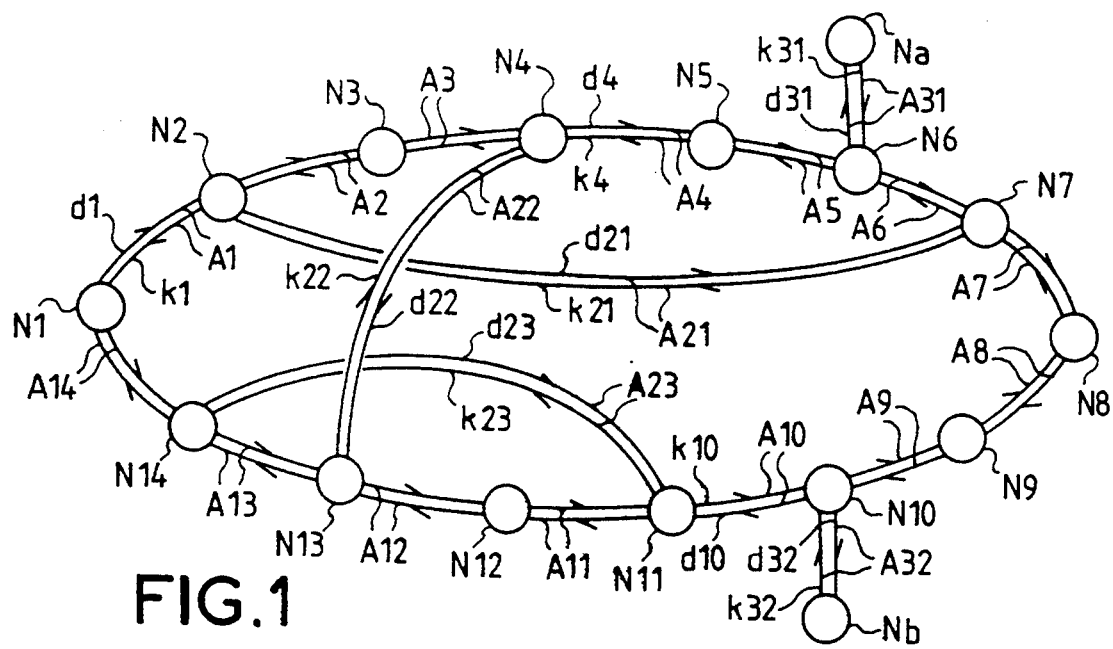
FIG. 1 is a diagram of a network for the implementation of the method according to the invention, showing all the links connecting the nodes of this network.

FIG. 1 is a diagram of a network designed according to the criteria mentioned here above to enable the implementation of a reconfiguration method. The different steps of this method shall be described by showing how, when normal operation according to the diagram of FIG. 2 is no longer possible because of disturbances indicated in FIG. 3, there is a way to obtain accurate operation of the network according to the diagram of FIG. 5.

FIG. 1 shows a meshed network comprising a loop formed by fourteen main communication nodes N1 to N14 connected by main lines A1 to A14, where the line Ai, with i ranging from 1 to 13, connects the node Ni to the node Ni+1 and where the line A14 connects the node N14 to the node N1. Three standby lines A21, A22, A23 respectively connect the nodes N2–NT, N4–N13, N11–N14. Two lateral nodes Na, Nb located outside the loop are connected by lateral lines A31, A32 respectively to the nodes N6 and N10.

Whatever may be the line Ai considered among the nineteen lines mentioned here above, it is constituted by two links di, ki, respectively called primary and secondary links, having opposite directions of transmission of signals. These directions are indicated by half-arrows (i.e. dashes representing split arrowheads) and, in the loop, the primary links di, with i=1 to i=14, are positioned in the clockwise direction. In FIG. 1, as in FIGS. 2 to 5, in order to avoid excessively burdening the drawings, the references of the lines and links are not all indicated.

Figure 2:
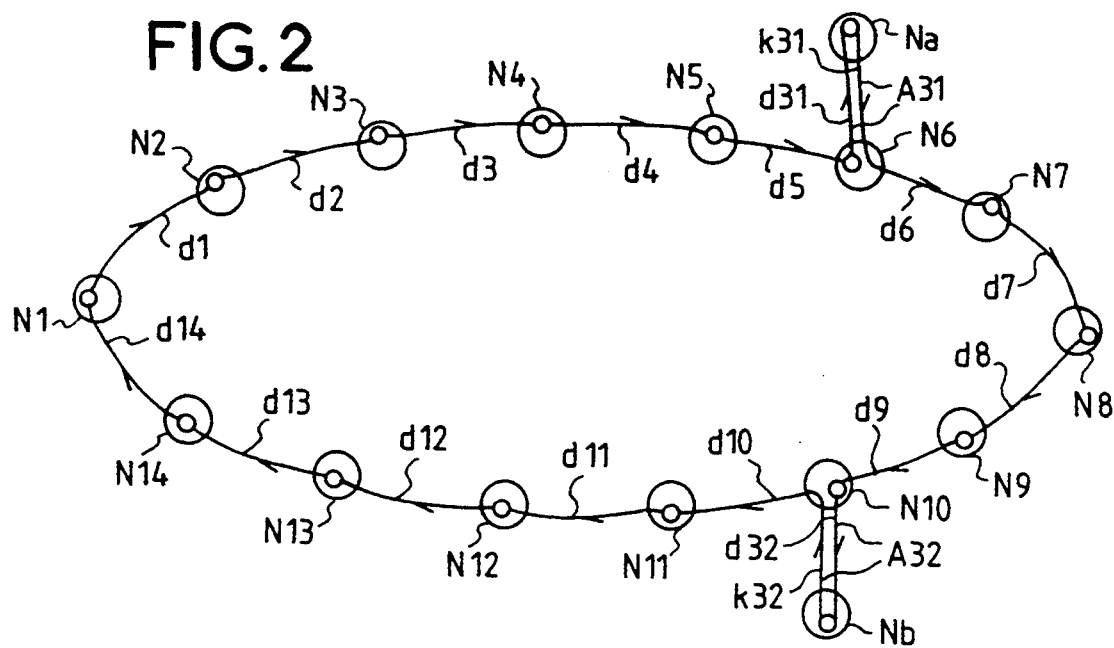
FIG. 2 is a diagram of the network of FIG. 1 with only the links used in normal operation, i.e. without any malfunctioning element in the network.

FIG. 2 is a diagram showing only the links that are used, during normal operation of the network, for the transmission of the multiplex signals. In FIG. 2, as in some of the following Figures, the management unit of each node is represented by a small circle inside a circle with a bigger diameter symbolizing a node: this makes it possible to show the way in which the signals are routed inside the nodes under the control of the management unit of the node considered: this routing is done either by direct passage, the management unit having only a checking role, in which case the routing of the signal between its entry into a node and its exit therefrom is drawn, by convention, without any crossing of the management unit or by passage with the signal being processed in the management unit, in which case the routing of the signal is drawn with a crossing of the management unit.

As can be seen in FIG. 2, the standby lines are not used in normal operation. The two links of the lateral lines A31, A32 are used and only the primary links, d1 to d14, of the main lines are used. A signal arriving at a node is routed to the management unit of the node to be processed therein, and the outgoing signal from the management unit is routed to an output of the node. However, in the case of the main nodes N6 and N10 which are connected respectively to the lateral nodes Na, Nb, if the information signal comes from the neighboring node positioned upstream in the loop, i.e. from N5 and N9 respectively, it is processed by the management unit to be routed to the lateral node. On the contrary, if the signal comes from the lateral node, then it is transmitted, with simple checking by the management unit, to the downstream unit, namely to N7 and N11 respectively. With a structure according to FIG. 2, it can be seen that, irrespectively of the node considered, the only information signals that it receives for processing are the information signals coming directly from only one other node and that, at most, it receives information signals directly from two different nodes. Hereinafter, we shall show how, despite breaks in the main lines, the network may, at least in certain cases, be reconfigured so that, once again, a node never has to process information signals coming directly from more than one node, i.e. in fact reconfigured so as to have a structure with all the management units of the nodes in cascade.

Figure 3:
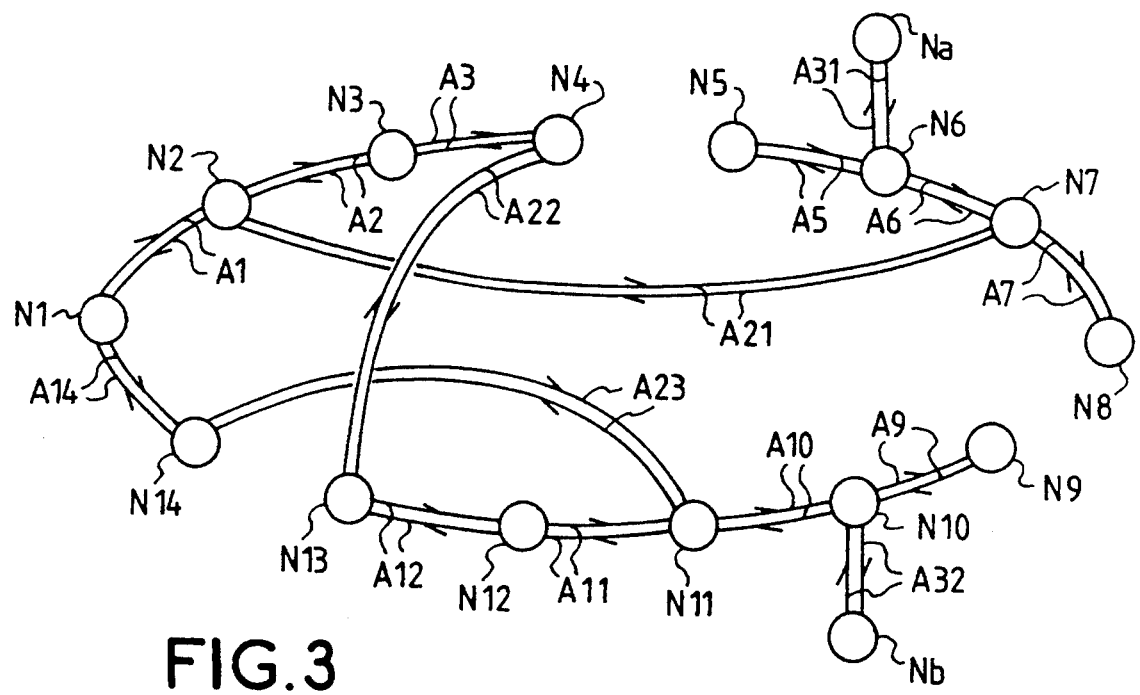
FIG. 3 is the diagram of the network of FIG. 1 after it has been damaged.

FIG. 3 is a diagram corresponding to the network of FIG. 1, but with the main lines A4, A8 and A13 not shown because they are defective. It must be noted that if one or more nodes had been defective in FIG. 3, this node or nodes would not have been shown. Nor would the lines reaching each defective node have been shown, since these lines would then be considered to be defective.

Figure 4:
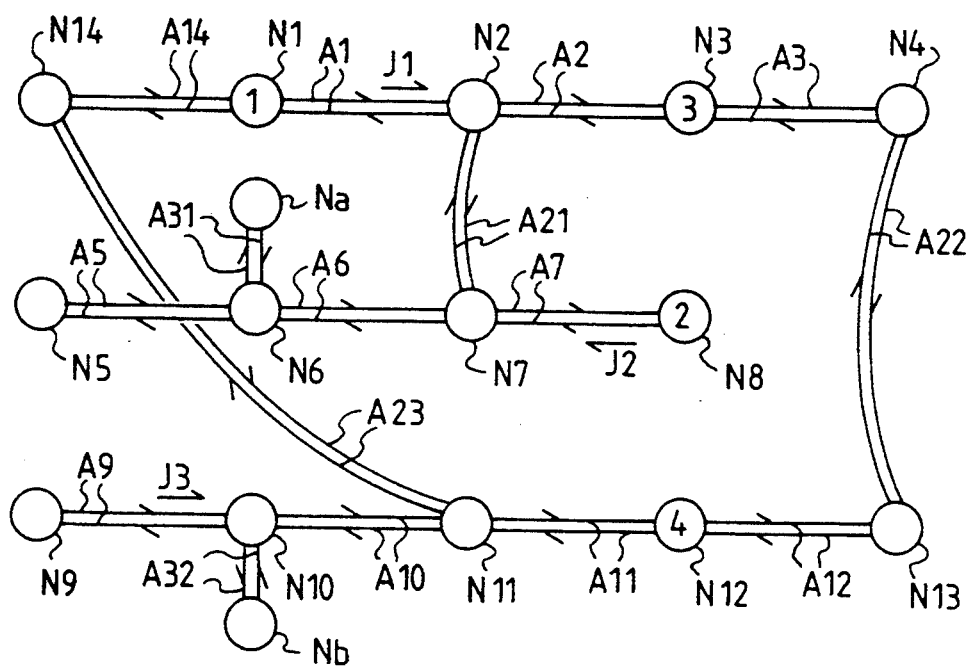
FIG. 4 is the diagram of the network of FIG. 3, but with the curves of certain lines modified.

FIG. 4 is a diagram corresponding to that of FIG. 3. However, in FIG. 4, since the three network sections cut off from the loop by the defective nature of the lines A4, A8 and A13 have been shown as horizontal, parallel straight-line segments, the two lateral lines A31, A32 have been shown as vertical straight-line segments and the three standby lines have been shown as curves so that they can easily be distinguished from the other lines. This depiction will provide for a clearer understanding of the basic idea of the network reconfiguration method and then enable an explanation of the way to implement this method.

To the extent that, as is the case in FIG. 4, there is a sufficient number of standby links in working condition to connect the network sections to one another directly or indirectly, it is possible, as can be seen in FIG. 4, to define a reconfiguration of the damaged network that has all the management units of the nodes available in cascade connection. This will necessitate the use of the secondary links of the main and standby lines and the keeping of only the number of standby lines that are strictly necessary. Otherwise redundancies would appear in the path that has to be taken by the information signal to travel through all the nodes of the network. Now, as can be seen in FIG. 5, in one structure formed by network sections coupled to one another by standby lines, to avoid redundancies, it is sufficient to keep only a number of standby lines that is smaller than the number of sections by one unit.

Figure 5:
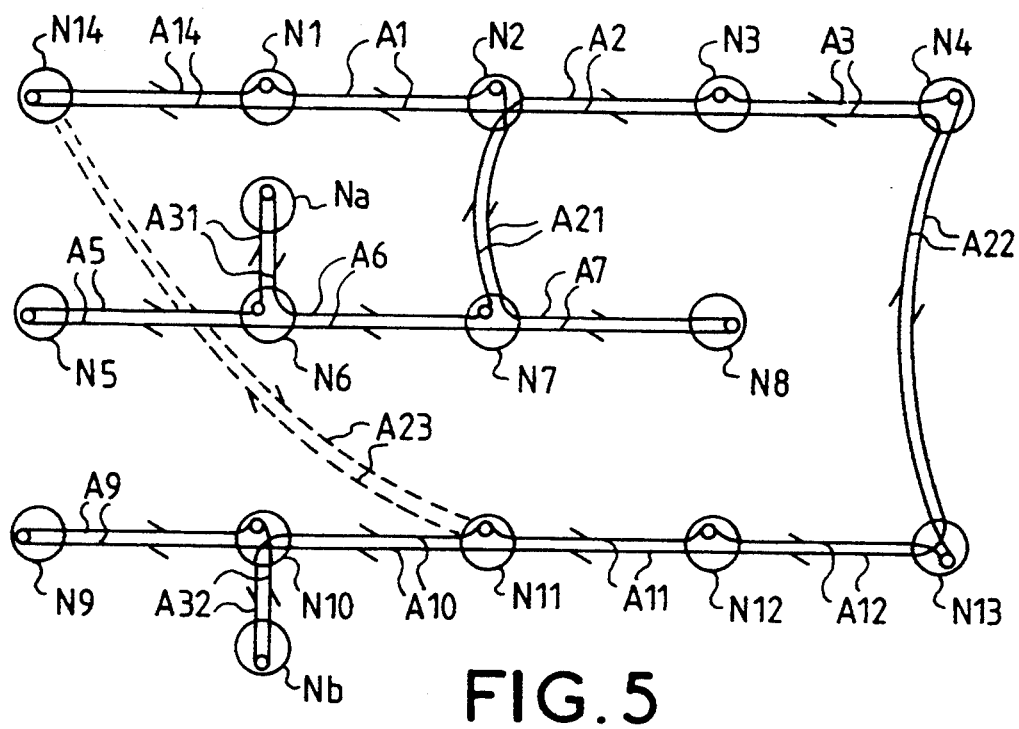
FIG. 5 is the diagram of the damaged network of FIGS. 3 and 4 after it has been reconfigured.

In FIG. 5, as in FIG. 2, inside the circle representing a node there is a circle representing the management unit of the node and lines representing routings of the information signals inside the node.

In the example described, the routings are done systematically as shown in FIGS. 6a to 6e which correspond respectively to:
a node with three lines in operation, whether the third line is a lateral line or a standby line;
a node with two main lines in operation;
a node with the main line upstream and a standby or lateral line in operation;
a node with the main line downstream and a standby or lateral line in operation;
a node with only one line in operation and if, in this Figure, it is a main line that is shown, then the routing will be done similarly for any other line, namely with the primary link and the secondary link connected respectively to two ports of the management unit of the node.

In these Figures, the nodes are designated by the reference N and their management unit is designated by the reference U, and to distinguish the main lines from the other lines, the latter are drawn with dashes but, for all the links shown, the direction of conduction has been indicated by a half-arrow. It must be noted that, in FIGS. 6a to 6d where there is more than one port, the rules applied are: a primary link from an upstream line goes to the management unit; a secondary link of a standby line or of a lateral line comes from the management unit; the primary link of a downstream line goes to the management unit only if there is no upstream line. Naturally, different rules may be set up to replace the primary links, in FIGS. 6a to 6d, by secondary links and vice versa.

Hereinafter, a method of reconfiguring a damaged network is described.

In a meshed network in operation, such as that of FIGS. 2 to 5, a node chosen from among the main nodes directs the exchanges among the nodes by giving permission to send messages. Furthermore, among the other main nodes, there exist nodes that are also capable of fulfilling the master function. All these nodes that are master nodes or are capable of being master nodes are assigned a priority that is never the same priority for two nodes. And it must be noted that, in this reconfiguration, the lateral nodes are never liable to be master nodes.

The role of the reconfiguration is not only that of determining a new path where the management units will all be cascaded but also that of choosing one and only one node to play the role of the master node. This could be the master node of the network in normal operation except, of course, if this node is damaged. This choice of the master node as well as the choice of the new path is made by an exchange of messages among the main nodes. But, first of all, each node that no longer receives any multiplex sign on one of its ports during a predetermined period of time deduces therefrom that there is an abnormal occurrence and short-circuits the port considered. This is the case with the nodes of FIG. 3, each of which had a port reached by one of the lines A4, A8 or A13 shown in FIG. 1. This is the preliminary stage during which each node in working condition tests its ports and gets ready to give its priority and address if it is liable to become a master node.

A search is then made, in each section, among the nodes liable to be master nodes, for the node assigned the highest priority level. Thus, among the nodes that are candidates for master status, if there are any in the section considered, one candidate master node is selected, and the priority of this node is then compared, by the standby links, with the priority of the candidate master nodes selected in the other sections and candidacies for the master function from nodes with the lowest priority levels are gradually eliminated until, finally, only one node that will take the master's role is kept. The redundancies referred to further above are avoided by keeping, if necessary, only k-1 standby lines, k representing, herein, the number of sections of the initial network that are likely to be reconfigured because they form a group in which the sections are connected to one another by the standby lines.

A non-restrictive example of the implementation of the method described here above is given hereinafter.

In this example, signals that will be called tokens flow in each section in order to determine, by the exchange of information among the nodes of the section, whether there is a node that is capable of being a master node and has the maximum priority in the section. If such a priority is found, it is put up for comparison with the other sections directly connected by a standby line, unless one of these other sections has already found its maximum priority node and has proposed it for comparison.

When, on one section, several nodes are awaiting an answer to a request for comparison, the token continues to circulate so that all the responses are recorded therein and so that the nodes of the section can take decisions accordingly. However, for this decision to be taken in a node, all the answers must be received. To this end, a part of the token is constituted by a counter whose value is incremented by one unit by each node that has sent out a request for a comparison of priority on a standby line and decremented by one unit when a response has been received. In FIG. 4, half-arrows associated with references J1, J2, J3 symbolize the tokens circulating respectively in the sections N14–N4, N5–N8 and N9–N13.

The nodes can take action on the contents of the token and send out comparison signals, answer a request for comparison and send signals known as synchronization signals. Furthermore, each node can become transparent, i.e. no longer take any action on the tokens that cross it and await the resumption of the dispatch of the multiplex signals preceded by a general synchronization signal sent out by the master node having the maximum priority in the reconfigured network.

To enable a clear understanding of the way in which this reconfiguration takes place, its different steps will be described in considering the network to be reconstituted of FIGS. 3, 4 with four candidate master nodes N1, N3, N8 and N12 with priorities with respective values 1, 2, 3, 4, which means that it is finally the node N12 that will be chosen as the master node of the reconfigured network; for an easier understanding of the description, the priority values have been indicated, in FIG. 4, in circles representing the candidate nodes.

Shortly after the network according to FIG. 2 has been damaged, bringing the circulation of the multiplex signals to a halt, the nodes N14, N5, N9 undergo an upstream fold-back and the nodes N4, N8, N13 undergo a downstream fold-back which consists in creating network sections such as the one going from N14 to N4, wherein a token will travel through the primary links of the main lines in one direction and through the secondary links of the main lines in the other direction.

Figure 6A:
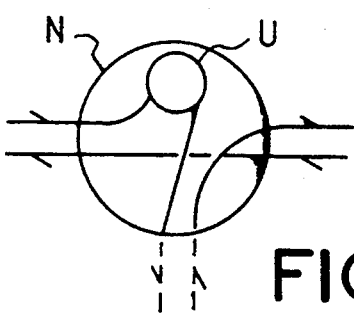
FIGS. 6a to 6e are diagrams pertaining to routings internal to the nodes of FIG. 5.
Figure 6B:
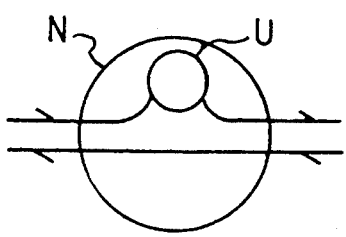
Figure 6C:
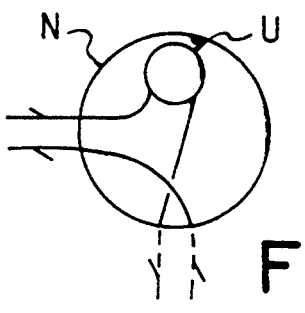
Figure 6D:
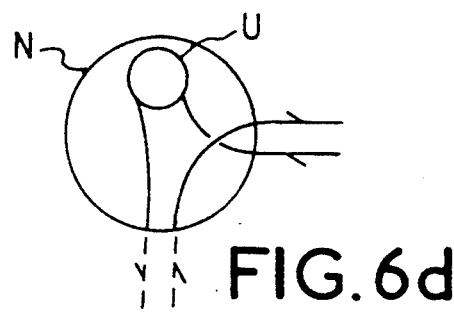
Figure 6E:
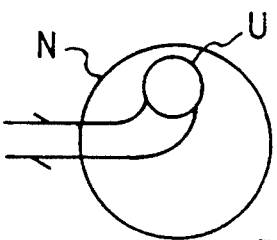

The nodes which are neither candidate master nodes nor in a state of downstream fold-back nor connected to a standby link become transparent and are connected to the lines as indicated in FIG. 6a for N6 and N10 and as indicated in FIG. 6e for Na and Nb; they may therefore be overlooked in the rest of the reconfiguration method.

The stopping of the multiplex signal triggers a time delay in each node, during which the node tests its ports, organizes its internal routings, prepares to give its address and its priority and goes into a state of transparency. To this end, any signal that reaches the node, whatever the port by which it arrives, is taken into account by the management unit of the node.

When the time delay is ended, each of the nodes in a state of upstream fold-back, namely the nodes N14, N5, N9, sends a token with its address but without any priority since none of these three nodes is a candidate master in the example described.

The token of the first section N14–N4 arrives by the primary link of the line A14 on N1. N1 which is a priority 1 candidate places its address in place of the address of N14 and indicates its priority 1 in the token. The token is then said to be confirmed by the recording of a priority. The token goes through N2 which is a non-candidate node, reaches N3 which, being a candidate with a priority greater than 1, puts its address in place of the address of N1 and indicates its priority 3 in the token in place of the priority recorded therein. The token continues its journey in the section: it crosses N4 without any modifications to be made to the token since N4 is not a candidate master; it crosses N3, N2, N1 without processing because the path is taken by the secondary link of the main lines; it crosses N1 which goes into a state of transparence because the priority of N1 is lower than that contained in the token and because no standby line reaches N1; it crosses N2 and reaches N3. The examination of the standby lines takes place at the same time as the operation of searching for the maximum priority in the section N14–N4. To this end, whenever a confirmed token goes through a node or reaches a standby line, a request for comparison of its priority is sent by the standby line to the section located at the other end of this standby line. Thus, the token confirmed by N1, when it goes through N2, triggers a request, through the standby line A21, for the comparison of its priority having the value 1; when the token goes through N4, it triggers a request, through the line A22, for a comparison of its priority having the value 3 given by the node N3; then, when the token reaches N2 from N4, after having crossed N3, it prompts a new request, through the standby line A21, for a comparison of priority but this time a comparison of its priority having the value 3 while, previously, it had the value 1. When the token goes through N14, it triggers a request, through the line A23, for a comparison of the priority having the value 3. For each of these requests for comparison, there is the corresponding incrementation of the counter by one unit which is then added to the token. This counter is reset at zero whenever a priority is recorded therein. Thus the recording, by N3, of the priority 3 resets the counter at zero when it has been at 1. Hence, after the sending of the request for a comparison of priority by N14, the counter is at 3.

It must be noted that, in the other two sections N5–N8 and N9–N13, the operations of searching for the highest priority and of making requests for comparison have been conducted in the same way and in parallel.

It shall now be assumed that the tokens confirmed by N3, N8 and N12 are confirmed temporally in the following order: firstly N3, then N8, then N12.

When the token confirmed by N8 is prepared and when it reaches the node N7, its priority having the value 2 is compared with the priority having the value 3 that has arrived by the line A21. Since this token has no counter and since its priority 2 is lower than the priority 3, the node N7, after having made the comparison, sends N2 a signal accepting higher priority and modifies the token by the introduction therein of its address and of an information element indicating that a higher priority exists in another section. This token, modified by N7, makes the nodes N8, N5, N6 and N7 go successively into a state of transparency inasmuch as they were not already in this state and the node N7 organizes its internal routing as indicated in FIG. 6a.

The node N2 therefore receives the priority acceptance signal by the line A21 and, when the token that flows in the section N14–N4 arrives in the management unit of N2, this unit decrements the counter by one unit, and this counter thus goes from 3 to 2.

When the token confirmed by N12 is prepared and when it reaches the nodes N13 and then N11, its priority having the value 4 is compared with the priority having the value 3 that has arrived respectively by the lines A22 and A23. Since this confirmed token has no counter and since its priority 4 is higher than the priority 3, the nodes N13 and N11, after having made the comparison, respectively send the nodes N4 and N14 a priority rejection signal, with the value of this new priority. Furthermore, this token causes all the nodes of the section N9–N13, other than the node N12 having maximum priority in the section, to be put into a state of transparency. It must be noted that, if nodes of the section N9–N13 had been awaiting a response to a request for comparison, they too would not have been put into a state of transparency.

The token that travelled in the section N14–N4 comprised, as indicated further above, the address of the node N3, the priority value 3 and a counter 2. It shall now be assumed that the token goes into N14 before the rejection of priority has been communicated by the line A23 but goes into the node N4 after the rejection of priority has been communicated by the line A22. In this case, the token is modified by the management unit of the node N4 which makes a recording therein of its address, the priority with a value 4 that has been transmitted to it by the line A22 and an information element showing that this priority comes from a section other than N14–N4. Furthermore, the counter of the token is not decremented simply by one unit even though a response was given only to the request for comparison of priority made from N4, but is reset at zero because the response was given with a higher priority. When this modified token reaches the node N14, its priority value of 4 is compared with the priority value of 4 that was received by the management unit of N14 through the line A23 and that had been associated with the rejection of priority. Since the two values are equal, it means that there is redundancy and, to prevent this redundancy, the node N14 eliminates the link through the line 23. The node N14 sends the token and then goes into transparency since it no longer awaits any answer and since the counter is at zero. This token goes through the nodes N1, N2, N3 which were already in a state of transparency and reaches the node N4 which recognizes its address and finds the counter again at zero. The node N4 deduces therefrom that the synchronization operation is ending, organizes its internal routing according to FIG. 6c and sends a synchronization signal that is transmitted to all the nodes of the network and, especially, to the nodes N2, N7, N13 which then organize their internal routings respectively according to FIGS. 6a, 6a and 6d. The reconfiguration is ended, and the network takes the form shown in FIG. 5 and the node N12 can send a general synchronization signal.

In the case of a synchronization which, following modifications or repairs, is done on a network comprising a complete loop such as the loop of FIG. 1, the reconfiguration method, as described, cannot function since the network does not have any nodes in a fold-back so much so that it is not possible to send out a token through a node in a state of upstream fold-back. To overcome this possible deficiency, the node that was previously a master node or a node pre-selected for this purpose sends out a pre-token. In the case of a defective node, i.e. one without a main loop, the pre-token is eliminated by the node in the downstream fold-back; in the case of a network with a main loop, this pre-token travels completely through the loop to return to its original node wherein it is converted into a token and this token subsequently has the same behavior as a token sent out by a node in an upstream fold-back, namely behavior comprising the exchange of requests for comparisons of priorities by the standby lines, the elimination of the redundant standby lines which, in the case of a main loop, are all the standby lines and the choice of the future master.

Variants as well as other procedures can be envisaged to reconfigure the network as defined at the beginning of this document in order to obtain a network wherein all the management units are positioned on one and the same loop, hence without redundancies. For example it is possible to expect that the maximum priority in a section will have been found before triggering requests for comparison of priority with the other sections.

It is also possible to carry out a reconfiguration in the case of a network comprising several loops that are distinct because they are distant from one another but are connected to one another by one or more standby lines. In this case, the following characteristics are necessary for each full loop: the existence of at least one candidate node for the position of the master node, the existence of at least one node that was previously a master node or the existence of a pre-selected node in order to send out a pre-token. By contrast, for the damaged loops, none of these characteristics is required except that, with the damaged loops only, there should be at least one candidate master node for the entire network. In this variant, each loop is considered to be a section of the example described by means of the Figures.

What is claimed is:

1. A method for the reconfiguration of a meshed network formed by at least three nodes and four lines, each of the nodes having at most three ports and at least one node being a control node to control the network, n of the nodes and n of the lines, where n is an integer greater than 2, being arranged in a main loop, and m of the lines, where m is an integer at most equal to n/2, forming standby lines, not used during normal operation of the network, formed between nodes of the main loop, the meshed network being designed for the transmission, by the lines, of signals between the nodes under control of the at least one control node, each line connecting a port of one of the nodes to a port of another of the nodes and comprising a primary link and a secondary link, the two links having opposite directions of signal transmission wherein, when any main line is determined to be defective, the method comprising the steps of:

determining at least two sections of nodes constituted by non-defective parts of the main loop, each of the at least two determined sections limited by two of the defective main lines;

determining a group formed by k of the sections of the nodes, where k is an integer greater than 1, which may be connected to one another by means of k-1 of the standby lines; and creating a reconfigured network by determining, in the group, a single path using the k sections of the group and said k-1 standby lines, this single path passing once and no more than once through each of the primary links and secondary links of each of the k sections of the group and of each of the k-1 standby lines.

2. The method of reconfiguration according to claim 1, wherein a search is made, in the sections of the group, of control nodes, and the control node with a highest priority is selected as a designated control node.

3. The method of reconfiguration according to claim 1, wherein a search is made in the group, section by section, for a control node with a highest priority, and comparisons are made, through the standby lines, between the highest priorities of the different sections in order to enable the selection of the node with the highest priority of the group as a designated control node.

4. The method of reconfiguration according to claim 3, wherein, in each section, a token constituted by a message in which the nodes record information elements relating to the nodes is made to circulate, the information elements contained in this token are used to make the comparisons and the results of the comparisons are recorded in this token.

5. The method of reconfiguration according to any of claims 1-3, wherein each of the respective nodes is put into a state of transparency as soon as it appears that the participation of this respective node is no longer needed to define the reconfiguration, and wherein this putting of the respective nodes into the state of transparency makes this respective node let through information elements without modification.

* * * * *